United States Patent [19]
Stevenson

[11] Patent Number: 5,552,062
[45] Date of Patent: Sep. 3, 1996

[54] METHOD FOR TREATMENT OF WASTE WATER CONTAMINATED WITH CYANIDE ION

[76] Inventor: Sanford M. Stevenson, 124 Braun Dr., McMurray, Pa. 15317

[21] Appl. No.: 173,360

[22] Filed: Dec. 23, 1993

[51] Int. Cl.⁶ ........................................................ C02F 1/72
[52] U.S. Cl. .......................................... 210/758; 210/904
[58] Field of Search ................................. 210/721, 904, 210/758

[56] References Cited

U.S. PATENT DOCUMENTS

| | | | |
|---|---|---|---|
| 3,617,567 | 11/1971 | Mathre | 210/904 |
| 3,826,741 | 7/1974 | Nakamura | 210/904 |
| 3,920,547 | 11/1975 | Garrison et al. | 210/904 |
| 4,749,497 | 6/1988 | Kanzleiter et al. | 210/721 |
| 4,822,496 | 4/1989 | Griffiths et al. | 210/721 |
| 5,106,508 | 4/1992 | Schwitzgebel | 210/712 |

Primary Examiner—Neil McCarthy
Attorney, Agent, or Firm—Daniel J. Long

[57] ABSTRACT

A method for treating waste water contaminated with cyanide ion, such as mine acid water is provided. The apparatus is readily portable and comprises a reaction vessel having an aerator motor operatively associated therewith. Water to be treated is received within said reaction vessel and is treated by having a neutralizing agent by way of chemical pumps and oxidant by way of the aerator introduced simultaneously into the system. Because of instantaneous elevation of pH resulting from the simultaneous introduction of oxidant and the neutralizing agent, the reaction time is greatly reduced and the equipment required is small, compact and easily transported. Where concentrations of manganese are present in the waste water being treated in this process, it is preferred that those manganese concentrations be reduced before the method of the present invention is initiated.

10 Claims, 2 Drawing Sheets

5,552,062

METHOD FOR TREATMENT OF WASTE WATER CONTAMINATED WITH CYANIDE ION

BACKGROUND OF THE INVENTION

This invention relates to a method and apparatus for treatment of waste water and more specifically it relates to water treatment of mine drainage.

Concern for the quality of natural water has grown in recent years. One problem which occurs in waste water from gold and silver mines and other industrial operations is the existence of cyanide ion concentrations in such water.

SUMMARY OF THE INVENTION

The present invention has produced a solution to the above-described need by providing a method and apparatus for treating water contaminated with cyanide ion concentrations. The enhanced efficiency of the unit minimizes power consumption requirements and lends itself to remote and low-cost operation. The invention provides a method of water treatment for the purpose of treating water contaminated with cyanide ion which results from gold and silver mine drainage and other industrial operations. The apparatus based on the invention is adapted to be a portable water treatment facility having the capability to introduce chemicals and gases into effluent water.

More particularly, the apparatus, in a preferred form, consists of a skid, a cylindrical reaction vessel, a series of baffles within the reaction vessel, pH, oxygen reduction potential (ORP) and ionization monitoring means, and piping to facilitate the contact of air, water and the necessary chemicals. Exterior to the tank are the aeration motor, metering pump, control panels, and other necessary parts. The method involves connecting the water treatment means to the water process stream. A source of power may be preferably incorporated into the unit. Also, a source of the necessary chemicals may also be incorporated into the unit.

DESCRIPTION OF THE PREFERRED EMBODIMENT

The present invention provides a method for reducing cyanide ion concentrations in waste water. The apparatus used in the method preferably consists of a reaction vessel having a series of baffles therein, a pH and ORP and ionization monitoring system and an aerator motor mounted on a skid and having the necessary piping connecting the aforementioned equipment. The apparatus is connected to a source of the raw water, such as a stream. The power source which may be, for example, a portable generator or line power, is connected to the apparatus to energize the system. A chemical substance is injected into the system which neutralizes the waste water. At generally the same point, an aerator introduces oxidant into the inffluent flow stream. The neutralization means and aeration means and waste water inffluent are in generally close proximity and oriented in generally the same axial position. The flow stream experiences substantially instantaneous adjustment of pH and the oxidation rate required for treatment is thereby greatly accelerated. This eliminates the need for long contact times for treatment chemistries to occur.

Figure 1:
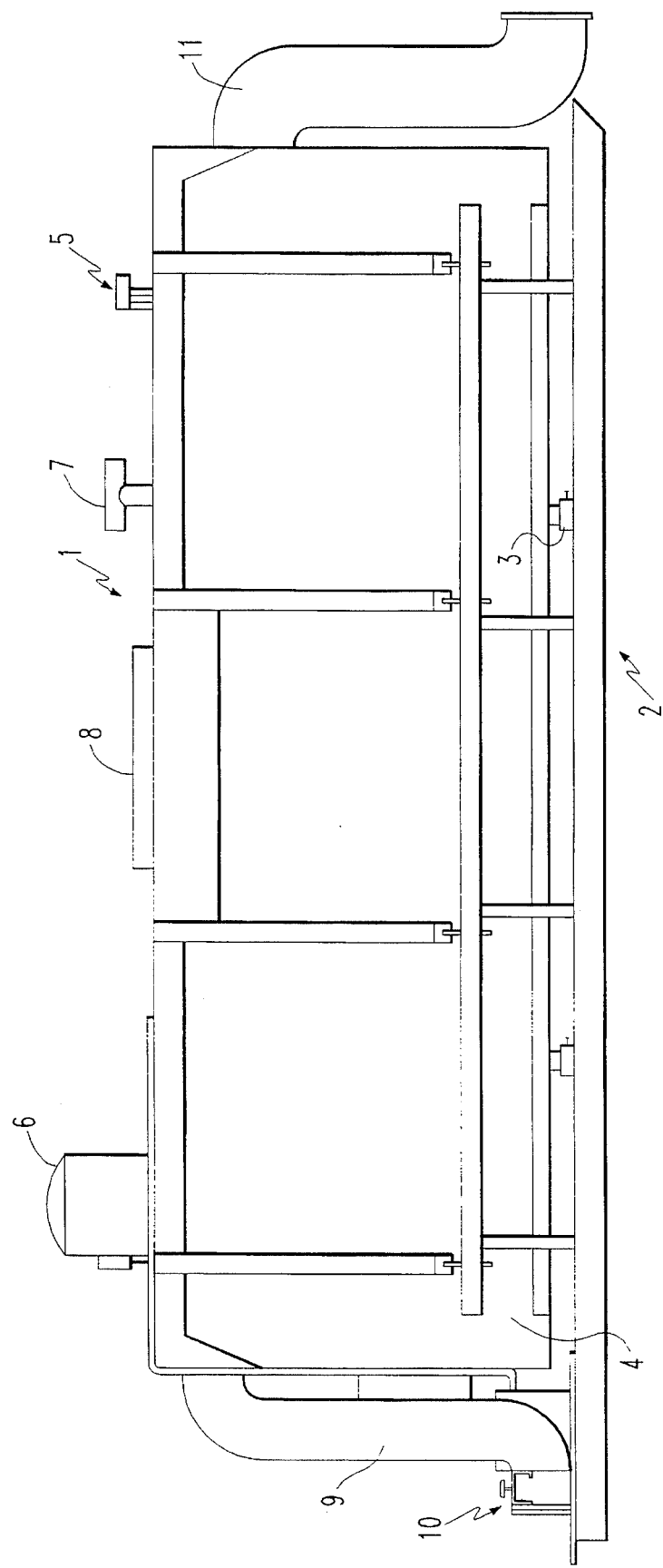
FIG. 1 is a front elevation of the apparatus used in the method of the present invention.

Referring to FIG. 1, portable waste water treatment apparatus 1 is shown. The treatment unit 1 is preferably mounted on a skid 2 by suitable mounting means 3. The unit comprises a cylindrical reaction vessel 4 having a plurality of baffles disposed therein (not shown). Reaction vessel 4 has a pH, ORP and ionization monitoring probe 5 mounted thereon. This probe may be any suitable standard industrial quality probe. Aerator motor 6 is also mounted on reaction vessel 4. Reaction vessel 4 has air vent 7 and mainway 8 on the top portion thereof.

Effluent conduit 9 receives water from a source indicated by the arrow 10. Effluent conduit 11 discharges the treated water.

Figure 2:
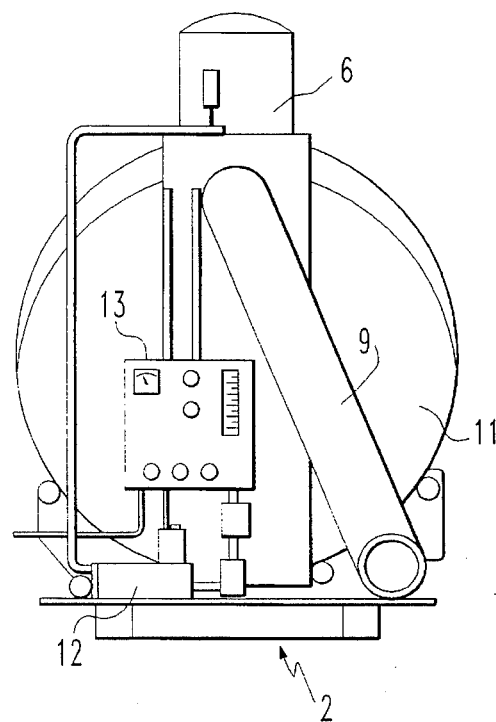
FIG. 2 is a side elevation of the apparatus used in the method of the present invention.

FIG. 2 shows metering pump or pumps 12, which is used to control the amount of chemical introduced into the system. Control panel 13 is used to monitor flow of fluids into the system. The metering pump through a pH, ORP and ionization monitoring device and programmable logic controller proportional integral differential (PLC-PID) control maintains a programmed pH level for the effluent.

Figure 3:
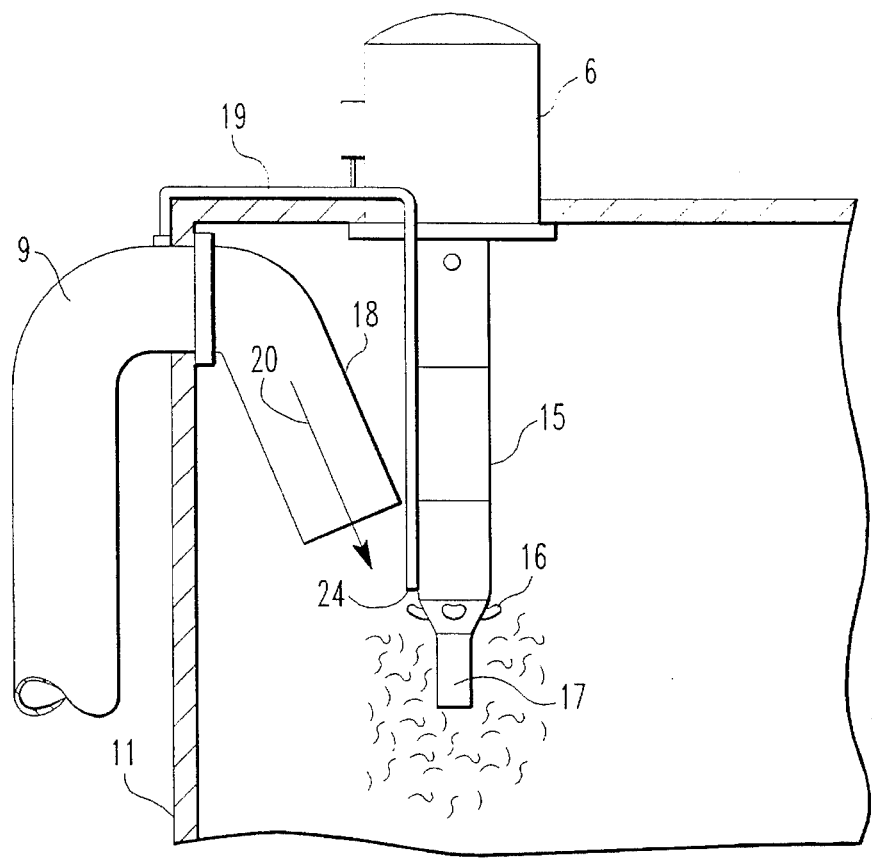
FIG. 3 is a sectional view of a part of the apparatus used in the method of the present invention showing the aerator motor and the point where oxidant neutralizing agent and waste water are simultaneously introduced into the system.

The method of treating the water may be considered in connection with the apparatus shown schematically in FIG. 3. Effluent water to be treated is received through inffluent pipe 9 and is transferred into reaction vessel 4 by way of conduit. The direction of flow is shown by arrow 20. Aerator shaft 15, extends from aerator motor 6. Chemical feed line or lines 19 extends along reaction vessel 4 in juxtaposition to aerator shaft discharge point 15, as shown in FIG. 3. It is also found that under certain conditions it may be advantageous to tilt the aerator shaft to the left of the position shown in FIG. 3 to push the water being treated in a more swirling motion. The chemical feed line would also be moved to maintain the same juxtaposed relation between the caustic feed line and the aerator shaft shown and is shown in FIG. 3. Chemical feed line or lines 19 chemical supply means (not shown) to the reaction vessel 4. The air flows through aerator shaft 15 and is agitated with aerator prop 16 at diffuser 17. At generally the same point, the neutralizing agent is received through chemical feed line or lines 19 and enters the system at the aerator prop 16. At this point, the water to be treated represented by flow arrow 20 meets the oxidation and the neutralization agents, as shown at the point where diffuser 17 emits the oxidant.

The tank is constructed to allow for aeration and neutralization to take place at generally the same point in the process flow. In this way, the flow stream experiences instantaneous adjustment of pH and the oxidation rate required for water treatment is greatly accelerated. After mixing of the oxidant, the chemical agent and the water to be treated, the mixing prop sends the mixture to an area of the tank that may contain internal baffles (not shown).

Internal baffles allow for mixing, turbulence increasing and extended contact time. The baffles insure that the treatment reactions are complete prior to discharge from the reaction vessel. The baffles are preferably elongated planar sheets spaced equidistantly throughout the tank. They may be the full height of the tank or only a portion of the height of the tank. The size of the openings and the location is dependent upon the fluid being processed. For example, in a 1,000 gallon tank two baffles may be placed an equal distance from each other and from the walls of the tank. The baffles may be stationary fiberglass perforated plates spaced evenly in the tank. The number of baffles, the height of the baffles inside the tank and the size of the openings are dependent upon the type of fluid flow that is contemplated for the system. It is found, however, that under certain conditions it may be advantageous to operate without the baffles so as to prevent fouling.

In operation, the device receives water to be treated 10 through inffluent pipe 9. The water is received generally in reaction vessel 4. The water is thus received into conduit 18 and is sent to the point of mix. Aerator motor 6 creates a flow of air (oxygen) through aerator shaft 15. Simultaneously, a neutralizing agent, such as sodium hydroxide, potassium hydroxide, hydrogen peroxide and mixtures thereof, is sent through chemical feed line 19. The air is discharged at diffuser 17 and the neutralizing agent is discharged at the end 24 of chemical feed line or lines 19. Aerator prop 16 agitates the surrounding fluid and the neutralizing agent, and the gas and the water to be treated are thereby mixed. As stated hereinbefore, the flow stream thus experiences sudden elevation of pH which greatly accelerates the oxidation rate required for treatment. The resulting fluid is sent to a detention structure for clarification of the treated effluents or directs to a dewatering step. The treated water can be discharged to a settling structure for solids removal. At this point, the settlement of sludge occurs. The simultaneous introduction of the air, water and the chemical in a regulated manner accelerates the reaction time. Because of this instantaneous reaction time, large bulk mixing and reaction chambers are not needed. Through the use of precision metering and control equipment, the process disclosed is self-regulating, compact, easily transportable, and can operate on a number of different power sources such as a portable generator or line power.

The unit can be readily transported, requires no operator, makes optimum use of power and chemicals, and requires little maintenance. In addition, the possibility exists that ozone, and or UV alone or with different reagents such as hydrogen peroxide, can be combined in the same manner to expand the environment in which this invention may be used. That is, other environments and other types of chemicals for treating various types of pollution are contemplated as within the scope of the claimed invention.

Whereas particular embodiments of the invention have been described above, for purposes of illustration, it would be evident to those skilled in the art that numerous variations of the details may be made without departing from the invention as defined in the appended claims.

I claim:

1. A method of treating water contaminated with cyanide ion without need of ozone or irradiation with ultraviolet light comprising:

providing a treatment unit comprising aerator means, said aerator means having a shaft extending therefrom into said treatment and said aerator means having agitation means, influent pipe means disposed generally adjacent to a discharge end of said aerator shaft and neutralizing agent feed line means disposed generally adjacent to an exit of said aerator means, providing means for introducing a source of water contaminated with cyanide ion into a treatment unit, introducing said water contaminated with cyanide ion to be treated into said treatment unit, introducing a neutralizing agent to raise the pH of the water into said treatment unit, introducing oxidant selected from air and gaseous oxygen at the same point at which neutralizing agent is introduced into the water to be treated, agitating said water, oxidant and neutralizing agent, providing a means for receiving precipitates from said mixture, and discharging treated water from the unit.

2. The method of claim 1, wherein said primary oxidant source is air.

3. The method of claim 1, wherein the neutralizing agent and the oxidant are simultaneously introduced into said water.

4. The method of claim 1 wherein said method is employed in treating mine waste water.

5. The method of claim 1 wherein said method is employed in treating industrial water.

6. The method of claim 1 wherein prior to treatment, said water is removed from a stream and introduced into said treatment unit; and after treatment said treated water is discharged into a settling structure for solids removal.

7. The method of claim 1 wherein prior to treatment, said water is removed from a stream and introduced into said treatment unit; and after treatment said treated water is discharged into a dewatering apparatus for solids removal.

8. The method of claim 1 wherein prior to treatment, said water is removed from a stream and introduced into said treatment unit; and after treatment said treated water is discharged into a settling structure then into said stream.

9. The method of claim 1 wherein prior to treatment, said water is removed from a stream and introduced into said treatment unit; and after treatment said treated water is discharged into a dewatering apparatus then into said stream.

10. The method of claim 1 wherein the pH is substantially instantaneously elevated.

\* \* \* \* \*